(12) United States Patent
Huang

(10) Patent No.: US 11,388,751 B2
(45) Date of Patent: Jul. 12, 2022

(54) DATA TRANSMISSION METHOD AND APPARATUS TECHNICAL FIELD

(71) Applicant: HUAWEI TECHNOLOGIES CO., LTD., Guangdong (CN)

(72) Inventor: Yangxin Huang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 49 days.

(21) Appl. No.: 16/799,677

(22) Filed: Feb. 24, 2020

(65) Prior Publication Data

US 2020/0275487 A1 Aug. 27, 2020

(30) Foreign Application Priority Data

Feb. 25, 2019 (CN) .......................... 201910136575.9

(51) Int. Cl.
*H04W 74/08* (2009.01)
*H04L 5/00* (2006.01)
*H04W 72/04* (2009.01)

(52) U.S. Cl.
CPC ....... *H04W 74/0816* (2013.01); *H04L 5/0082* (2013.01); *H04W 72/0446* (2013.01); *H04W 74/08* (2013.01)

(58) Field of Classification Search
CPC ............... H04W 74/08; H04W 74/085; H04W 74/0808
See application file for complete search history.

(56) References Cited

U.S. PATENT DOCUMENTS

| 10,244,536 B1 * | 3/2019 | Jiang | H04W 72/048 |
| 10,412,759 B2 * | 9/2019 | Ahn | H04W 72/14 |

(Continued)

FOREIGN PATENT DOCUMENTS

CN 105900516 B 5/2019

OTHER PUBLICATIONS

XP032847993 M. Udin Harun Al Rasyid et al., "Performance of multi-hop networks using beacon and non-beacon scheduling in Wireless Sensor Network (WSN)",2015 International Electronics Symposium (IES),total 6 pages.

(Continued)

*Primary Examiner* — Raj Jain
(74) *Attorney, Agent, or Firm* — Womble Bond Dickinson (US) LLP

(57) ABSTRACT

Embodiments of this application provide a data transmission method and apparatus. The data transmission method is applied to a network based on a CSMA/CA mechanism and the network includes a plurality of nodes that share one channel. According to the data transmission method, a sending node determines, in the plurality of nodes through a first clear channel assessment, that the channel is idle. The sending node then waits for a delay duration, and performs a second clear channel assessment on the channel after the delay duration. The sending node sends a data frame to a receiving node in the plurality of nodes through the channel in response to determining, through the second clear channel assessment, that the channel is idle. The sending node performs a clear channel assessment twice before sending a data frame, which reflects priorities of different types of data frames and shortens a network latency.

14 Claims, 8 Drawing Sheets

(56) References Cited

U.S. PATENT DOCUMENTS

| | | | |
|---|---|---|---|
| 2012/0230318 A1* | 9/2012 | Zhang | H04W 24/02 |
| | | | 370/338 |
| 2015/0117333 A1* | 4/2015 | Wang | H04L 1/18 |
| | | | 370/329 |
| 2016/0278088 A1 | 9/2016 | Cheng et al. | |
| 2018/0139775 A1 | 5/2018 | Ahn et al. | |
| 2018/0213563 A1 | 7/2018 | Yang et al. | |
| 2019/0223220 A1* | 7/2019 | Choi | H04W 74/0816 |
| 2020/0007276 A1* | 1/2020 | Kholaif | H04L 63/1458 |
| 2020/0275487 A1* | 8/2020 | Huang | H04W 74/0808 |

OTHER PUBLICATIONS

XP036506548 Mouloud Atmani et al.,"Towards bandwidth and energy optimization in IEEE 802.15.4 wireless sensor networks",dated Oct. 31, 2017,total 24 pages.

\* cited by examiner

DATA TRANSMISSION METHOD AND APPARATUS TECHNICAL FIELD

CROSS-REFERENCE TO RELATED APPLICATION

This application claims priority to Chinese Patent Application No. 201910136575.9, filed on Feb. 25, 2019, which is herein incorporated by reference in its entirety.

TECHNICAL FIELD

Embodiments of this application relate to the communications technologies field, and in particular, to a data transmission method and apparatus.

BACKGROUND

A low-rate wireless personal area network LR-WPAN is a set of devices communicating with each other via the Institute of Electrical and Electronics Engineers (IEEE) 802.15.4 standard by using a same radio channel in a personal area network (PAN). In the LR-WPAN network, a node accesses a channel based on a carrier sense multiple access with collision avoidance (CSMA/CA) mechanism defined in the IEEE 802.15.4 standard. There are three types of CSMA algorithms, respectively: a non-persistence algorithm, a 1-persistence algorithm, and a P-persistence algorithm. The non-persistence algorithm means that when a medium is busy, a random time is waited for, and data is sent when the medium is idle. The 1-persistence algorithm means that when a medium is busy, a node continues to monitor until the medium is idle, and then sends data immediately. The P-persistence algorithm means that when a medium is busy, a node continues to monitor until the medium is idle and sends data at a probability P, and delays, at a probability 1-P, sending data at a next slot. The P-persistence algorithm is a compromise, which can not only reduce conflicts like the non-persistence algorithm, but also reduce idle time of the medium like the 1-persistence algorithm.

In addition, two different communication modes are formulated by the IEEE 802.15.4 standard, and are respectively: beacon frame enabled communication and non beacon frame enabled communication. In the beacon frame enabled communication, a channel is accessed by using a slotted CSMA/CA mechanism, and in the non beacon frame enabled communication, a channel is accessed by using an unslotted CSMA/CA mechanism. In the slotted CSMA/CA mechanism, slots of nodes in the PAN need to be aligned with each other, and a backoff period needs to be aligned with a slot boundary divided in a superframe. However, in the unslotted CSMA/CA mechanism, slots of nodes do not need to be aligned with each other, and a backoff period has no correlation in time domain.

At present, in the unslotted CSMA/CA mechanism, because the slots of the nodes are not aligned with each other, and a moment at which each node in a network accesses a channel is random in time domain, the nodes preempt the channel. Consequently, data frames with different priorities may back off due to that the channel is preempted by another data frame, or may even be discarded due to that a number of backoffs exceeds a maximum number of backoffs. The foregoing manner of preempting a channel increases a network latency, and reduces data transmission effectiveness.

SUMMARY

Embodiments of this application provide a data transmission method and apparatus, to shorten a network latency and improve data transmission efficiency and channel utilization.

According to a first aspect, an embodiment of this application provides a data transmission method, the method is applied to a network based on an unslotted CSMA/CA mechanism, the network includes a plurality of nodes, and the plurality of nodes share one channel. A sending node in the plurality of nodes determines that the channel is idle through a first clear channel assessment; the sending node waits for delay duration, and performs a second clear channel assessment on the channel after the delay duration; and the sending node sends a data frame to a receiving node in the plurality of nodes through the channel if determining, through the second clear channel assessment, that the channel is idle.

According to the data transmission method provided in the first aspect, the sending node needs to perform a clear channel assessment twice before sending the data frame. When the channel is determined idle through the first clear channel assessment, the data frame is not sent, and the delay duration needs to be waited for and then the second clear channel assessment is performed. In this way, a data frame with a low priority is prevented from preempting a channel resource of a data frame with a high priority, to reflect priorities of different types of data frames. This method can shorten a network latency, reduces a network packet loss rate and a data retransmission rate, and improves data transmission efficiency and channel utilization.

In one embodiment, the data transmission method may further include: updating, by the sending node, a first value and a second value based on whether an acknowledge frame sent by the receiving node is received by the sending node, where the first value is used to indicate a quantity of data frames successfully sent successively by the sending node, and the second value is used to indicate a quantity of data frames unsuccessfully sent successively by the sending node; and adjusting, by the sending node, the delay duration based on the first value and the second value.

According to the data transmission method provided in this embodiment, the delay duration may be adjusted based on a congestion status and a data transmission status of a network, and a network latency is further shortened based on an actual network status, so that a network packet loss rate and a data retransmission rate are reduced, and data transmission efficiency and channel utilization are improved.

In one embodiment, the delay duration is an interframe spacing IFS.

In one embodiment, if the data frame is a long frame, the IFS is $\max(T_{LIFS}, T_{turnaround}) + \beta \cdot T_{cca}$; or if the data frame is a short frame, the IFS is $\max(T_{SIFS}, T_{turnaround}) + \beta \cdot T_{cca}$; where $T_{LIFS}$ represents a preset long interframe spacing LIFS, $T_{SIFS}$ represents a preset short interframe spacing SIFS, $T_{turnaround}$ represents preset duration of switching between receiving and sending statuses of a transceiver, $T_{cca}$ represents duration required by a clear channel assessment, $\beta$ represents a dynamic adjustment coefficient, and max( ) represents a MAX function.

In one embodiment, the adjusting, by the sending node, the delay duration based on the first value and the second value may include: adjusting, by the sending node, the dynamic adjustment coefficient βa based on the first value and the second value; and calculating, by the sending node, the IFS based on an adjusted dynamic adjustment coefficient β.

According to the data transmission method provided in this embodiment, the dynamic adjustment coefficient β is adjusted by using the first value and the second value. Further, the IFS may be adjusted in real time based on a method for calculating the IFS when the data frame is a long frame or a short frame. In this way, the delay duration is adjusted based on a congestion status and a data transmission status of a network, a network packet loss rate and a data retransmission rate are further reduced, and data transmission efficiency and channel utilization are improved.

In one embodiment, the adjusting, by the sending node, the dynamic adjustment coefficient β based on the first value and the second value includes: if the first value is greater than a first preset threshold, adjusting the dynamic adjustment coefficient β is adjusted to 1; and if the second value is greater than a second preset threshold, adjusting the dynamic adjustment coefficient β is adjusted to a random value between 1 and a maximum value of the dynamic adjustment coefficient, where the maximum value of the dynamic adjustment coefficient is greater than 1.

In one embodiment, when the first value is greater than the first preset threshold, it indicates that a network status is good and a data transmission success rate is relatively high. In this case, the dynamic adjustment coefficient β is adjusted to 1, and the duration of the IFS is a minimum value. Therefore, a network latency is further shortened, data transmission efficiency and channel utilization are improved, and a network capacity is improved. When the second value is greater than the second preset threshold, it indicates that the network is relatively congested, and the data transmission success rate is relatively low. In this case, the dynamic adjustment coefficient β is adjusted to a random value between 1 and the maximum value of the dynamic adjustment coefficient, and the duration of the IFS is increased. Therefore, network congestion is prevented from continuing to deteriorate, a network packet loss rate and a data retransmission rate are further reduced, and a data transmission success rate is improved.

In one embodiment, the sending, by the sending node, a data frame to a receiving node in the plurality of nodes through the channel includes: selecting, by the sending node, a CSMA algorithm based on the dynamic adjustment coefficient β; and sending, by the sending node through the channel, the data frame to the receiving node based on the selected CSMA algorithm, where the selecting, by the sending node, a CSMA algorithm based on the dynamic adjustment coefficient β includes: selecting a 1-persistence CSMA algorithm when the dynamic adjustment coefficient β is 1; and selecting a P-persistence CSMA algorithm when the dynamic adjustment coefficient β is greater than 1.

In one embodiment, a CSMA algorithm is selected based on the dynamic adjustment coefficient β. A smaller dynamic adjustment coefficient β indicates shorter duration of the IFS. A larger dynamic adjustment coefficient β indicates longer duration of the IFS. The 1-persistence CSMA algorithm or the P-persistence CSMA algorithm is selected based on the dynamic adjustment coefficient β, so that the network latency is further shortened when a network status is good, and data transmission efficiency is improved; or when a network status is relatively poor, a compromise effect is achieved between reducing network conflicts and reducing an idle time of the channel.

In one embodiment, the data transmission method may further include: performing, by the sending node, a clear channel assessment on the channel after preset duration if determining, by using the P-persistence CSMA algorithm, that the data frame cannot be sent to the receiving node through the channel, and performing the data transmission method again.

In one embodiment, the updating, by the sending node, a first value and a second value based on whether an acknowledge frame sent by the receiving node is received by the sending node includes: increasing, by the sending node, the first value by 1 and setting the second value to 0 if receiving the acknowledge frame sent by the receiving node; or increasing, by the sending node, the second value by 1 and setting the first value to 0 if the sending node does not receive the acknowledge frame sent by the receiving node.

In one embodiment, if the channel is determined busy through the first clear channel assessment or if the channel is determined busy through the second clear channel assessment, the method further includes: obtaining a current number of backoffs NB and a backoff exponent BE; if the number of backoffs NB is less than or equal to a preset maximum number of backoffs, the number of backoffs NB and the backoff exponent after backoff duration, performing a clear channel assessment on the channel, and performing the data transmission method again, where the backoff duration is a product of a random value between 0 and $2^{BE}-1a$ and a unit backoff period.

In one embodiment, an embodiment of this application provides a data transmission apparatus, applied to a network based on an unslotted CSMA/CA mechanism, where the network includes a plurality of nodes, the plurality of nodes share one channel, the data transmission apparatus is a sending node in the plurality of nodes, and the apparatus includes: a channel assessment module, configured to determine, through a first clear channel assessment, that the channel is idle, where the channel assessment module is further configured to perform a second clear channel assessment on the channel after delay duration; and a sending module, configured to send a data frame to a receiving node in the plurality of nodes through the channel if determining, through the second clear channel assessment, that the channel is idle.

In one embodiment, the apparatus may further include a receiving module, an updating module, and an adjustment module, where the updating module is configured to update a first value and a second value based on whether an acknowledge frame sent by the receiving node is received by the receiving module, where the first value is used to indicate a quantity of data frames successfully sent successively by the sending module, and the second value is used to indicate a quantity of data frames unsuccessfully sent successively by the sending module; and the adjustment module is configured to adjust the delay duration based on the first value and the second value.

In one embodiment, the delay duration is an interframe spacing IFS.

In one embodiment, if the data frame is a long frame, the IFS is $\max(T_{LIFS}, T_{turnaround})+\beta \cdot T_{cca}$; or if the data frame is a short frame, the IFS is $\max(T_{SIFS}, T_{turnaround})+\beta \cdot T_{cca}$; where $T_{LIFS}$ represents a preset long interframe spacing LIFS, $T_{SIFS}$ represents a preset short interframe spacing SIFS, $T_{turnaround}$ represents preset duration of switching between receiving and sending statuses of a transceiver, $T_{cca}$ represents duration required by a clear channel assessment, β represents a dynamic adjustment coefficient, and max( ) represents a MAX function.

In one embodiment, the adjustment module may include a coefficient adjustment unit and an IFS adjustment unit; the coefficient adjustment unit is configured to adjust the dynamic adjustment coefficient β according to the first value and the second value based on the first value and the second value, and the IFS adjustment unit is configured to calculate the IFS based on an adjusted dynamic adjustment coefficient β.

In one embodiment, the coefficient adjustment unit is specifically configured to: if the first value is greater than a first preset threshold, adjust the dynamic adjustment coefficient β is adjusted to 1; and if the second value is greater than a second preset threshold, adjust the dynamic adjustment coefficient β is adjusted to a random value between 1 and a maximum value of the dynamic adjustment coefficient, where the maximum value of the dynamic adjustment coefficient is greater than 1.

In one embodiment, the sending module includes an algorithm selection unit and a sending unit; the algorithm selection unit is configured to select a CSMA algorithm based on the dynamic adjustment coefficient β; and the sending unit is configured to send a data frame to the receiving node through the channel based on the selected CSMA algorithm, where the algorithm selection algorithm is specifically configured to: select a 1-persistence CSAM algorithm when the dynamic adjustment coefficient β is 1; and select a P-persistence CSMA algorithm when the dynamic adjustment coefficient β is greater than 1.

In one embodiment, the channel assessment module is further configured to: perform, by the sending unit, the first clear channel assessment on the channel again after preset duration if determining, by using the P-persistence CSMA algorithm, that the data frame cannot be sent to the receiving node through the channel In one embodiment, the updating module is specifically configured to: increase the first value by 1 and set the second value to 0 if the receiving module receives the acknowledge frame sent by the receiving node; or increase the second value by 1 and set the first value to 0 if the receiving module does not receive the acknowledge frame sent by the receiving node.

In one embodiment, the apparatus further includes a backoff module, where the backoff module is configured to: if the channel assessment module determines, through the first clear channel assessment, that the channel is busy, or determines, through the second clear channel assessment, that the channel is busy, obtain a current number of backoffs NB and a backoff exponent BE; if the number of backoffs NB is less than or equal to a preset maximum number of backoffs, update the number of backoffs NB and the backoff exponent after backoff duration, where the backoff duration is a product of a random value between 0 and $2^{BE}-1$ and a unit backoff period. The channel assessment module is further configured to perform the first clear channel assessment again on the channel after the backoff duration.

In one embodiment, an embodiment of this application provides a data transmission device, including a processor, a memory, and a transceiver, where transceiver is configured to receive data or send data, the memory is configured to store instructions, and the processor is configured to execute the instructions stored in the memory to implement the data transmission method according to the first aspect and any implementation of the first aspect.

In one embodiment, an embodiment of this application provides a computer readable storage medium, storing a computer executable instruction, where when the computer executable instruction is executed by at least one processor, the data transmission method provided in the first aspect and any one implementation of the first aspect is implemented.

In one embodiment, an embodiment of this application provides a program product. The program product includes a computer program (that is, an executable instruction), and the computer program is stored in a readable storage medium. When the computer program is read and executed by at least one processor, the at least processor may perform the data transmission method provided in the first aspect and any implementation of the first aspect.

The embodiments of this application provide a data transmission method and apparatus that are applied to a network based on an unslotted CSMA/CA mechanism. The network includes a plurality of nodes, and the plurality of nodes share one channel. A sending node determines that the channel is idle through a first clear channel assessment; the sending node waits for delay duration, and performs a second clear channel assessment on the channel after the delay duration; and the sending node sends a data frame to a receiving node in the plurality of nodes through the channel if determining that the channel is idle through the second clear channel assessment. The sending node performs a clear channel assessment twice. When the channel is determined idle through the first clear channel assessment, the data frame is not sent, and the delay duration needs to be waited for and then the second clear channel assessment is performed. Only when the channel is determined idle through the second clear channel assessment, the data frame is sent. In this way, a data frame with a low priority is prevented from preempting a channel resource of a data frame with a high priority, so that a network latency is shortened, a network packet loss rate and a data retransmission rate are reduced, and data transmission efficiency and channel utilization are improved.

DESCRIPTION OF EMBODIMENTS

Figure 1:
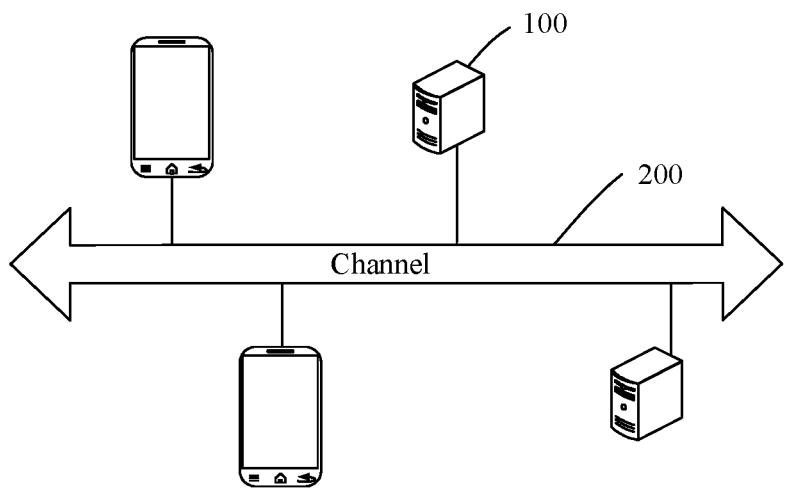
FIG. 1 is a system architectural diagram of a communications system to which an embodiment of this application is applicable.

An embodiment of this application provides a sending node and a data transmission method based on unslotted CSMA/CA. For example, FIG. 1 is a system architectural diagram of a communications system to which an embodiment of this application is applicable. As shown in FIG. 1, the communications system includes a plurality of nodes 100. The plurality of nodes 100 share one channel 200 to implement mutual communication. For each node 100, when the node 100 sends data to another node, the node 100 may be referred to as a sending node. When the node 100 receives data send by another node, the node 100 may be referred to as a receiving node. In one embodiment, after receiving the data sent by the sending node, the receiving node may notify, by using feedback acknowledgement information, the sending node that the data is successfully sent. In a communications system, at a moment, only one node 100 sends data.

It should be noted that, a type of a communications network, a type of the channel 200, a communication protocol used by the communications network, a type of the node 100, and a quantity of nodes 100 are not limited in this embodiment.

For example, the node 100 may be a terminal device, a tablet computer, a computer, a server, an electric meter, a water meter, various Internet of Things devices, and the like.

For example, the communications system may be an LR-WPAN. The plurality of nodes 100 may implement mutual communication according to the IEEE 802.15.4 standard.

It should be noted that in all embodiments of this application, a data transmission method based on unslotted CSMA/CA provided in this application is described by using an example in which the communications system is an LR-WPAN.

A process in which nodes in the LR-WPAN send data according to the IEEE 802.15.4 standard is described below. The node accesses the channel by using an unslotted CSMA/CA mechanism. In the unslotted CSMA/CA mechanism, each node saves two variable parameters: a number of backoffs (NB) and a backoff exponent (BE). The NB is the number of backoffs that the CSMA-CA has performed when the sending node attempts to transmit a current data frame. The BE is related to a backoff time that the sending node waits for before trying a channel assessment. In addition, four constant configuration parameters are further set: a unit backoff period (aUnitBackoffPeriod), a minimum backoff exponent (macMinBE), a maximum backoff exponent (macMaxBE), and a maximum number of backoffs (macMaxCsmabackoffs). The minimum backoff exponent macMinBE≤the backoff exponent BE≤the maximum backoff exponent macMaxBE. The number of backoffs NB≤the maximum number of backoffs macMaxCsmaBackoffs. The minimum backoff exponent and the maximum backoff exponent limit a value range of the BE. The maximum number of backoffs limits a maximum value of the NB. It should be noted that specific values of the unit backoff period, the minimum backoff exponent, the maximum backoff exponent, and the maximum number of backoffs are not limited.

Figure 2:
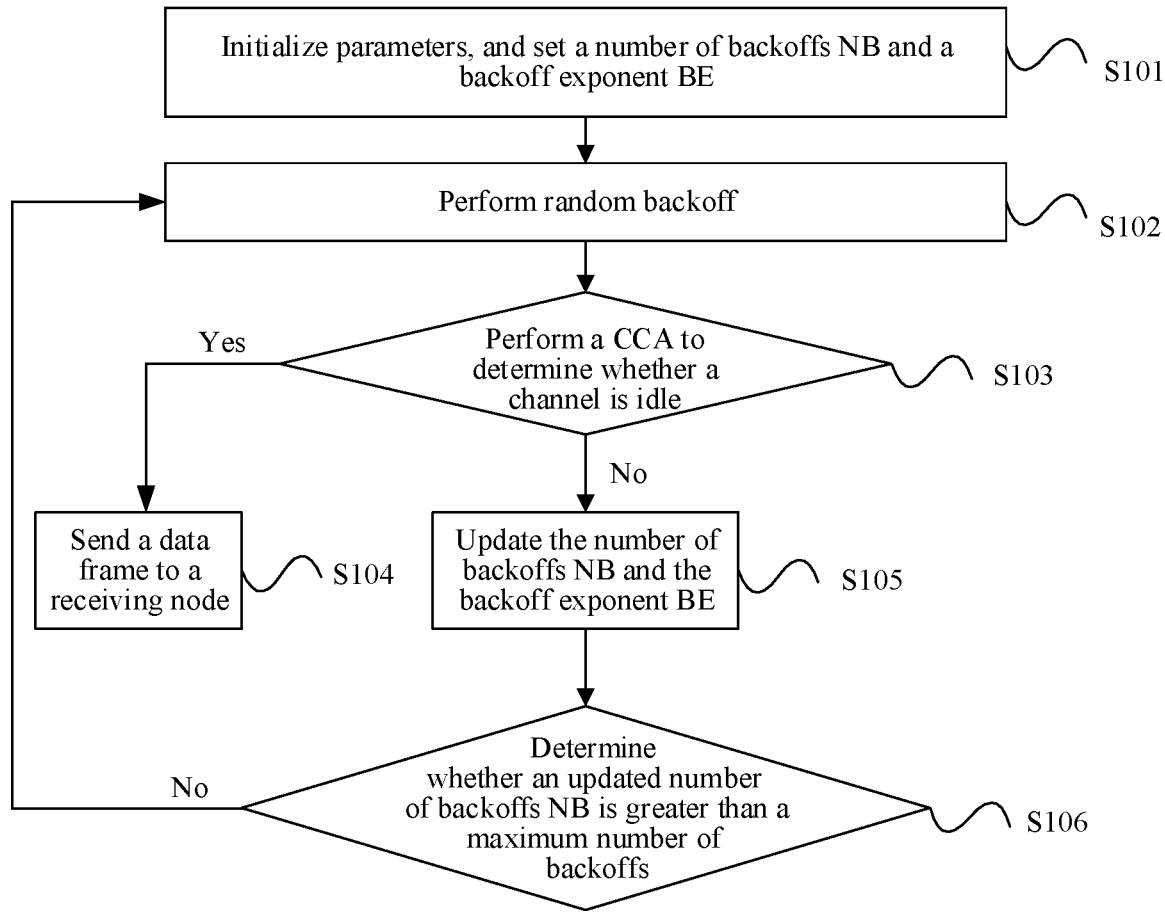
FIG. 2 is a flowchart of sending data by a sending node in an LR-WPAN.

FIG. 2 is a flowchart of sending data by a sending node in an LR-WPAN. As shown in FIG. 2, a method for sending data by a sending node may include the following operations.

S101: Initialize a parameter.

Specifically, the sending node sets a number of backoffs NB to 0, and a backoff exponent BE is a minimum backoff exponent macMinBE.

S102: Perform a random backoff.

Specifically, the sending node obtains a random value in a range $(0, 2^{BE}-1)$. A product of the unit backoff period aUnitBackoffPeriod and the random value is determined as backoff duration. The sending node performs a backoff based on the backoff duration. By backing off, the sending node may temporarily give up occupying the channel resource, and contends again for occupying the channel resource after waiting for the backoff duration, thereby reducing conflicts and improving channel utilization.

S103: Perform the clear channel assessment (CCA) to determine whether the channel is idle after the random backoff ends.

The CCA is an algorithm in the IEE 802.15.4 standard, and refer to descriptions in the IEEE 802.15.4 standard.

If the channel is determined idle, S104 is performed.

If the channel is determined busy, S105 and S106 are performed.

S104: Send a data frame to the receiving node.

In this case, the sending node successfully accesses the channel. In one embodiment, the sending node may further determine, based on whether information fed back by the receiving node is received by the sending node, whether the data is successfully sent.

S105: Update the number of backoffs NB and the backoff exponent BE.

Specifically, the sending node increases a value of the number of backoffs NB by 1. The sending node increases a value of the backoff exponent BE by 1. If an updated backoff exponent BE is greater than the maximum backoff exponent macMaxCsmaBackoffs, the value of the backoff exponent BE is updated as a maximum backoff exponent macMaxBE.

S106: Determine whether the updated number of backoffs NB is greater than the maximum number of backoffs macMaxCsmaBackoffs.

Specifically, if the updated number of backoffs NB is greater than the maximum number of backoffs macMaxCsmaBackoffs, it indicates that the sending node fails to access the channel. The sending node gives up sending the data frame of this time. If the updated number of backoffs NB is no greater than the maximum number of backoffs macMaxCsmaBackoffs, the sending node enters a next backoff status by using the updated backoff exponent BE, that is, returns to perform S102.

Figure 3:
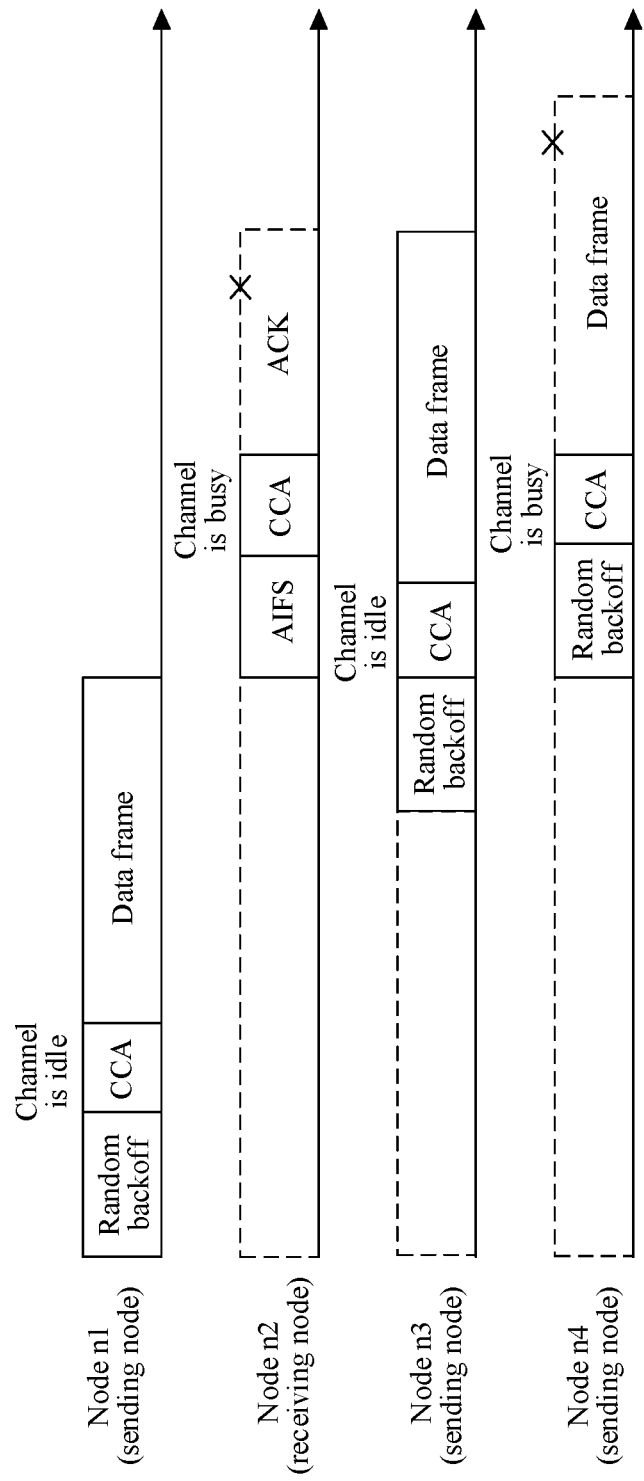
FIG. 3 is a schematic diagram of occupying channels by a plurality of nodes when a data frame is sent by using the method shown in FIG. 2.

The method for sending data by the sending node shown in FIG. 2 is described below by using a specific example and with reference to FIG. 3. FIG. 3 is a schematic diagram of occupying channels by a plurality of nodes when a data frame is sent by using the method shown in FIG. 2. In FIG. 3, three sending nodes n1, n3, n4 and a receiving node n2 are included.

As shown in FIG. 3, the sending node n1 performs the CCA after performing the random backoff. If determining that the channel is idle through the CCA, the sending node n1 may send a data frame to the receiving node n2.

After receiving the data frame sent by the sending node n1, the receiving node n2 performs the CCA after waiting for an acknowledgement interframe spacing (AFIS). The channel is determined busy through the CCA by the receiving node n2 because the sending node n3 is sending a data frame through the channel. In this case, the receiving node n2 cannot send an acknowledge frame (ACK) to the sending node n1. It should be noted that the duration of the AFIS is not limited in this embodiment. Refer to the IEEE 802.15.4 standard.

The sending node n3 performs the CCA after performing the random backoff. If determining that the channel is idle through the CCA, the sending node n3 may send a data frame.

The sending node n4 performs the CCA after performing the random backoff. The channel is determined busy through the CCA by the sending node n4 because the sending node n3 is sending a data frame through the channel. In this case, the sending node n4 cannot send a data frame. Then the sending node n4 performs the operation of S106 in FIG. 2, and enters a backoff stage to wait for a next channel access or stop sending a data frame.

It can be learned that when the unslotted CSMA/CA mechanism is used in the LR-WPAN, because no slot alignment exists between nodes, and a moment at which each node in the network accesses a channel is random in time domain, priorities of different types of data frames cannot be reflected. In addition, a data frame with a high priority may back off because a channel is preempted by a data frame with a low priority. Consequently, a network latency is increased, and a data frame with a high priority is even discarded due to that the number of backoffs exceeds the maximum number of backoffs. For example, in FIG. 3, the receiving node n2 should return an ACK to the sending node n1 after receiving the data frame sent by the sending node n1. The priority of the ACK is higher than priorities of the data frames sent by the sending node n3 and the sending node n4. However, because the sending node n3 preempts the channel, the receiving node n2 cannot send the ACK to the sending node n1. If the ACK always fails to be sent, the sending node n1 may consider that the data frame is not successfully sent and resend the data frame, further causing network congestion and an increase in the network latency. Moreover, as a network scale increases, a quantity of nodes in a network gradually increases, and limitations existing in the unslotted CSMA/CA mechanism become more obvious.

For the foregoing technical problem, an embodiment of this application provides a data transmission method based on unslotted CSMA/CA. The sending node performs clear channel assessment on a channel twice successively, and sends a data frame only when the channel is determined idle. In this way, data with a low priority is prevented from preempting a channel resource of data with a high priority, so that a network latency is shortened, and data transmission efficiency is improved.

Related parameters in the embodiments of this application are described below. Details are shown in Table 1 and Table 2. Table 1 shows names and definitions of variables. Table 2 shows names and definitions of constants.

TABLE 1

| Constant | |
| --- | --- |
| Constant | Definition |
| NB | Number of backoffs |
| BE | Backoff exponent |
| $T_{IFS}$ | Duration of an IFS |
| $C_{suc}$ | Number of times that an ACK is received when the node successively sends data frames successfully |
| $C_{fail}$ | Number of times that an ACK is not received due to a timeout when the node successively sends data frames |
| β | Dynamic adjustment coefficient |
| P | Probability that a node sends a data frame |

TABLE 2

| Constant | |
| --- | --- |
| Constant | Definition |
| macMinBe | Minimum backoff exponent |
| macMaxBE | Maximum backoff exponent |
| macMaxCsmaBackoffs | Maximum number of backoffs |
| TLIFS | Duration of an IFS |
| TSIFS | Duration of an SIFS |
| TAIFS | Duration of an AIFS |

TABLE 2-continued

| Constant | |
| --- | --- |
| Constant | Definition |
| Tturnaround | Duration of switching between receiving and sending statuses of a transceiver |
| Tcca | Duration required by a clear channel assessment |
| Tp | Duration required for accessing a channel again when P-persistence CSMA refuses to access |
| Nmax_randnum | Upper limit of the dynamic adjustment coefficient |
| Cmax_suc | A threshold of the number of times that an ACK is received when the node successively sends data frame successively |
| Cmax_fail | A threshold of the number of times that an ACK is not received due to a timeout when the node successively sends data frames |

The technical solutions of this application and how the foregoing technical problem is resolved by the technical solutions of this application are described in detail below by using embodiments. The following several embodiments may be combined with each other, and a same or similar concept or process may not be described repeatedly in some embodiments.

Figure 4:
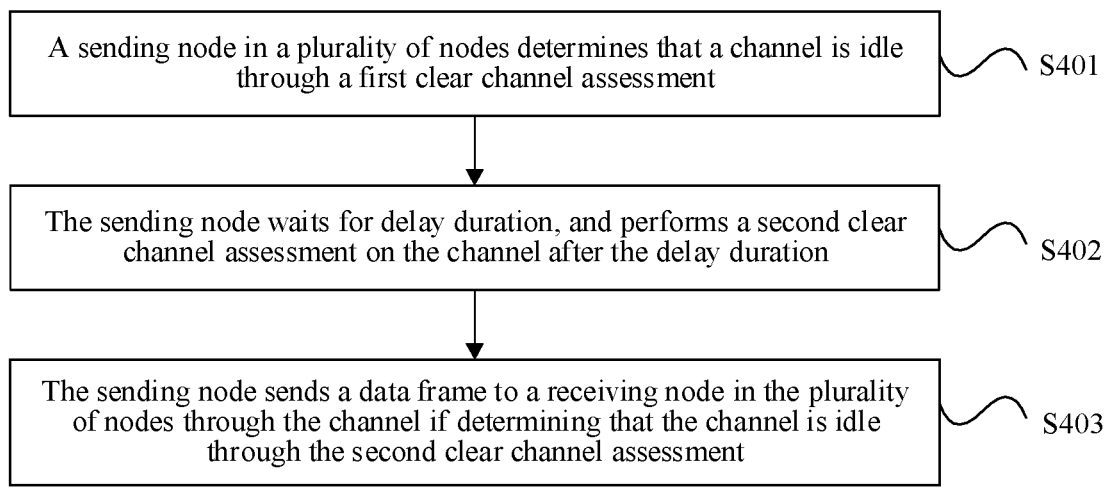
FIG. 4 is a flowchart of a data transmission method based on unslotted CSMA/CA according to an embodiment of this application.

An embodiment of this application provides a data transmission method based on unslotted CSMA/CA, and the data transmission method is applied to a network based on a CSMA/CA mechanism. The network includes a plurality of nodes. The plurality of nodes share one channel. An execution body of the method may be a sending node in the plurality of nodes. As shown in FIG. 4, the method may include the following operations:

S401: Determine, by the sending node in the plurality of nodes, that the channel is idle through a first clear channel assessment.

S402: Wait, by the sending node, for delay duration, and perform a second clear channel assessment on the channel after the delay duration.

S403: Send, by the sending node, a data frame to a receiving node in the plurality of nodes through the channel if determining, through the second clear channel assessment, that the channel is idle.

Figure 5:
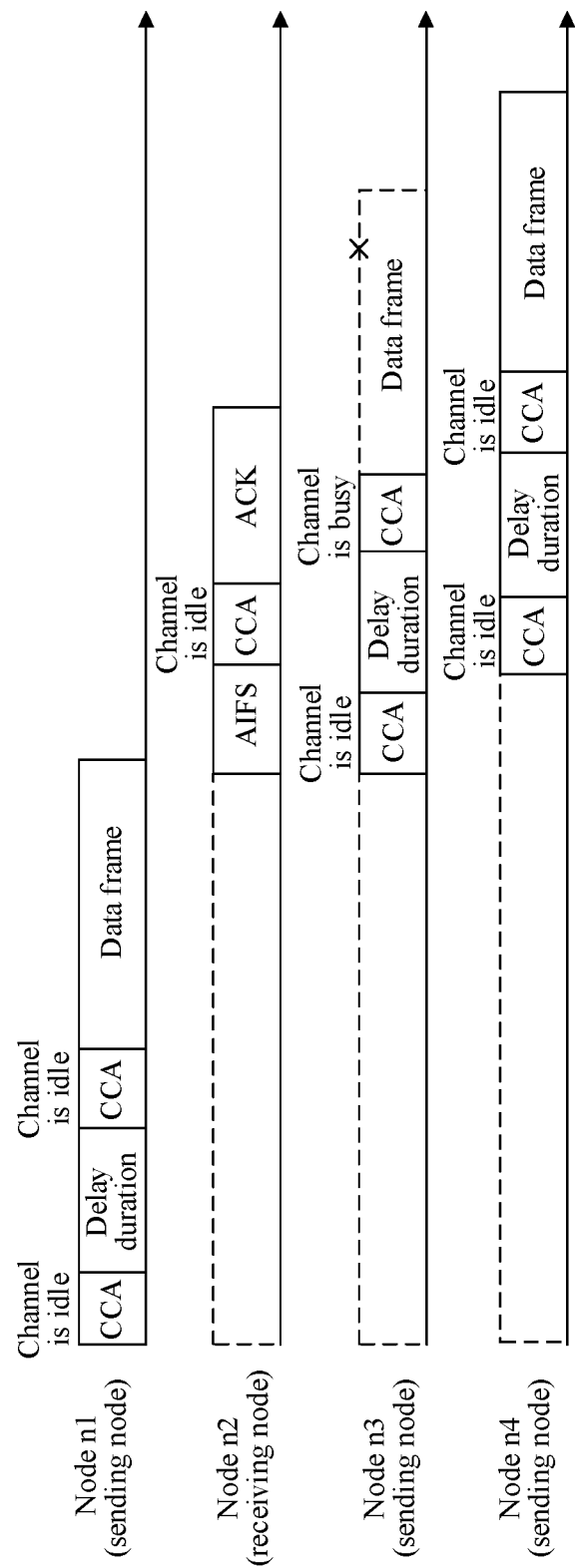
FIG. 5 is a schematic diagram of occupying channels by a plurality of nodes when a data frame is sent by using the method shown in FIG. 4.

The method shown in FIG. 4 is described below with reference to FIG. 5 by using a specific example. FIG. 5 is a schematic diagram of occupying channels by a plurality of nodes when a data frame is sent by using the method shown in FIG. 4;

In FIG. 5, a sending node n1 determines that the channel is idle through a first clear channel assessment (CCA). After the delay duration, the sending node n1 determines that the channel is still idle through a second CCA. The sending node n1 may send a data frame to the receiving node n2.

After receiving the data frame sent by the sending node n1, and waiting for an AFIS, a receiving node n2 performs a CCA. The channel is determined idle through the CCA. The receiving node n2 may send an ACK to the sending node n1. Correspondingly, the sending node n1 receives the ACK sent by the receiving node n2, to determine that the data frame is successfully sent.

It is assumed that a sending node n3 prepares to access the channel exactly after the sending node n1 finishes sending the data frame. The sending node n3 determines that the channel is idle through a first CCA. After the delay duration, the sending node n3 performs a second CCA. The sending node n2 is sending an ACK, and the channel is already preempted by the sending node n2. Therefore, the sending node n3 determines that the channel is busy through the second CCA. In this case, the sending node n3 cannot send a data frame. Subsequently, the sending node n3 may enter a backoff stage and not preempt the channel resource of the receiving node n2.

It is assumed that a sending node n4 prepares to access the channel exactly when the receiving node n2 is performing a CCA. The sending node n4 determines that the channel is idle through a first CCA. After the delay duration, the sending node n4 determines that the channel is still idle through a second CCA. The sending node n4 may send a data frame. In this way, the sending node n4 does not preempt the channel resource of the receiving node n2 as well.

It can be learned that, according to the data transmission method based on unslotted CSMA/CA provided in this embodiment, the sending node needs to perform a clear channel assessment twice before sending a data frame. When the channel is determined idle through the first clear channel assessment, the data frame is not sent, and the delay duration needs to be waited for and then the second clear channel assessment is performed. In this way, a data frame with a low priority is prevented from preempting a channel resource of a data frame with a high priority, to reflect priorities of different types of data frames. For example, for the receiving node n2 and the sending node n3, a priority of the data frame sent by the sending node n3 is lower than a priority of the ACK sent by the receiving node n2. In the process in which the receiving node n2 sends the ACK, the sending node n3 does not preempt the channel resource. In this way, a network latency is reduced, a network packet loss rate and a data retransmission rate are reduced, and data transmission efficiency and channel utilization are improved.

In addition, as the network scale increases, the quantity of the nodes in the network gradually increases. A quantity of hidden nodes also increases. The hidden nodes correspond to exposed nodes. The exposed nodes are those nodes that can detect that the sending node sends a data frame. The hidden nodes are those nodes that cannot detect that the sending node sends a data frame. For example, a node A sends a data frame to a node B. A node C does not detect that the node A sends a data frame to the node B. Then, the node A and the node C may both send a data frame to the node B. In this case, data frames sent to the node B are all eventually lost as a result of a signal conflict. This problem may be referred to as a hidden node problem. According to the data transmission method based on unslotted CSMA/CA provided in this embodiment, the sending node performs a clear channel assessment twice before sending a data frame, so that a moment at which an exposed node performs a CCA can be effectively staggered from a moment at which a hidden node performs a CCA, thereby alleviating a problem of a hidden node, reducing a network packet loss rate and a data retransmission rate, improving channel utilization, and finally improving transmission efficiency of an entire network.

If the network is an LR-WPAN, for the clear channel assessment, refer to the description of the CCA in FIG. 2. If the network is a network of another type, the clear channel assessment may be any algorithm than can assess whether a channel is idle in the network.

It should be noted that a specific value of the delay duration is not limited in this embodiment. The value may be a fixed value, or may be a variable value. In one embodiment, delay duration corresponding to different sending nodes may be a same value, or may be different values.

In one embodiment, in an implementation, the delay duration is a preset value. A specific value of the preset value is not limited in this embodiment.

In one embodiment, in another implementation, the delay duration is an interframe spacing (IFS).

In the IEEE 802.15.4 standard, the IFS is defined as spacing duration that is reserved for the node to process the received data frames and that is between two data frames that are successively sent. Based on a type and a length of a frame of the data frame, a length of the IFS may include: an AIFS, a short interframe spacing (SIFS), and a long interframe spacing (LIFS).

In one embodiment, if the data frame is a long frame, the IFS may be obtained by the formula 1. If the data frame is a short frame, the IFS may be obtained by the formula 2.

$$T_{IFS}=\max(T_{LIFS}, T_{turnaround})+\beta \cdot T_{cca} \quad \text{Formula 1}$$

$$T_{IFS}=\max(T_{SIFS}, T_{turnaround})+\beta \cdot T_{cca} \quad \text{Formula 2}$$

$T_{IFS}$ represents an IFS, $T_{LIFS}$ represents a preset LIFS, $T_{SIFS}$ represents a preset SIFS, $T_{turnaround}$ represents preset duration of switching between receiving and sending statuses of a transceiver, $T_{cca}$ represents duration required by a clear channel assessment, $\beta$ represents a dynamic adjustment coefficient, and max( ) represents a MAX function.

Referring to Table 2, the parameters $T_{LIFS}$, $T_{SIFS}$, $T_{turnaround}$, and $T_{cca}$ are all constant parameters. Specific values of the parameters are not limited in this embodiment. Referring to Table 1, the parameters $T_{IFS}$ and $\beta$ are variable parameters. A value of the dynamic adjustment coefficient $\beta$ may be a fixed value, or may be a variable value. When the value of the dynamic adjustment coefficient $\beta$ is variable, $T_{IFS}$ is variable. Correspondingly, when the delay duration is the IFS, the delay duration is variable.

In one embodiment, the data transmission method based on unslotted CSMA/CA provided in this embodiment may further include:

updating, by the sending node, the first value and the second value based on whether an acknowledge frame sent by the receiving node is received by the sending node. The first value is used to indicate a quantity of data frames successfully sent successively by the sending node, and the second value is used to indicate a quantity of data frames unsuccessfully sent successively by the sending node.

The sending node adjusts the delay duration based on the first value and the second value.

Referring to Table 1, the first value may be denoted as $C_{suc}$, and the second value may be denoted as $C_{fail}$.

Specifically, the sending node sends a data frame to the receiving node. When receiving the acknowledge frame sent by the receiving node, the sending node determines that the data frame is successfully sent. When the sending node does not receive the acknowledge frame sent by the receiving node, the sending node determines that the data frame is unsuccessfully sent. If the quantity of data frames successfully sent successively by the sending node becomes larger, that is, the first value is larger, it indicates that the network is more unobstructed, and the data transmission success rate is higher. If the quantity of data frames unsuccessfully sent successively by the sending node becomes more, that is, the second value is larger, it indicates that the network is more congested, and the data transmission success rate is lower. It can be learned that a congestion status of a network and a data transmission status may be reflected by using the first value and the second value.

Therefore, the sending node adjusts the delay duration based on the first value and the second value, so that the delay duration is adjusted based on a congestion status of a network and a data transmission status, a network latency is further shortened based on an actual network status, a network packet loss rate and a data retransmission rate are reduced, and data transmission efficiency and channel utilization are improved.

It should be noted that the sending node may send data frames to different receiving nodes. Correspondingly, the sending node may receive acknowledge frames sent by different receiving nodes.

In one embodiment, the updating, by the sending node, the first value and the second value based on whether an acknowledge frame sent by the receiving node is received by the sending node may further include:

increasing, by the sending node, the first value by 1 and setting the second value to 0 if receiving the acknowledge frame sent by the receiving node; or increasing, by the sending node, the second value by 1 and setting the first value to 0 if the sending node does not receive the acknowledge frame sent by the receiving node.

The first value and the second value are described below by using specific examples.

It is assumed that a time sequence of sending data frames by the node A is as follows: The node A sends a data frame to the node B, sends a data frame to the node C, sends a data frame to the node B, sends a data frame to the node C, sends a data frame to a node D, sends a data frame to a node E, and sends a data frame to the node B.

Initial values of the first value and the second value are both 0.

When receiving an acknowledge frame sent by the node B, the node A increases the first value by 1, and sets the second value to 0. In this case, the first value is 1, and the second value is 0.

When continuing to receive an acknowledge frame sent by the node C, the node A increases the first value by 1, and sets the second value to 0. In this case, the first value is 2, and the second value is 0.

When continuing to receive an acknowledge frame sent by the node B, the node A increases the first value by 1, and sets the second value to 0. In this case, the first value is 3, and the second value is 0.

When the node A does not receive an acknowledge frame sent by the node C due to a timeout, the node A increases the second value by 1, and sets the first value to 0. In this case, the first value is 0, and the second value is 1.

When the node A continues to fail to receive an acknowledge frame sent by the node D due to a timeout, the node A increases the second value by 1, and sets the first value to 0. In this case, the first value is 0, and the second value is 2.

When the node A continues to receive an acknowledge frame sent by the node E, the node A increases the first value by 1, and sets the second value to 0. In this case, the first value is 1, and the second value is 0.

When the node A continues to receive an acknowledge frame sent by the node C, the node A increases the first value by 1, and sets the second value to 0. In this case, the first value is 2, and the second value is 0.

How to adjust the delay duration is described below when the delay duration is an IFS and the IFS is determined based on the foregoing formula 1 or formula 2.

In one embodiment, that the sending node adjusts the delay duration based on the first value and the second value may include:

adjusting, by the sending node, the dynamic adjustment coefficient $\beta$ based on the first value and the second value; and calculating, by the sending node, the IFS based on an adjusted dynamic adjustment coefficient $\beta$.

Specifically, a congestion status of a network and a data transmission status may be reflected by the first value and the second value. The dynamic adjustment coefficient $\beta$ is adjusted based on the first value and the second value, and then the IFS may be adjusted based on the formula 1 or the formula 2. In this way, delay duration is adjusted based on a congestion status of a network and a data transmission status, a network packet loss rate and a data retransmission rate are further reduced, and data transmission efficiency and channel utilization are improved.

In one embodiment, the adjusting, by the sending node, the dynamic adjustment coefficient $\beta$ based on the first value and the second value may include:

if the first value is greater than a first preset threshold, adjusting the dynamic adjustment coefficient $\beta$ is adjusted to 1; and if the second value is greater than a second preset threshold, adjusting the dynamic adjustment coefficient $\beta$ is adjusted to a random value between 1 and a maximum value of the dynamic adjustment coefficient, where the maximum value of the dynamic adjustment coefficient is greater than 1.

Referring to Table 2, the first preset threshold may be denoted as $C_{max\_suc}$, the second preset threshold may be denoted as $C_{max\_fail}$, and the maximum value of the dynamic adjustment coefficient may be denoted as $N_{max\_randnum}$. Referring to Table 1, the first value may be denoted as $C_{suc}$, and the second value may be denoted as $C_{fail}$.

The dynamic adjustment coefficient $\beta$ may be obtained based on a formula 3.

$$\beta=\{Random1,[N|max\_randnum),Cfail>Cmax\_fail1, Csuc>Cmax\_suc \quad \text{Formula 3}$$

It can be learned that a value range of the dynamic adjustment coefficient $\beta$ is [1,)N|max_randnum).

When the first value is greater than the first preset threshold, it indicates that a network status is good and a data transmission success rate is relatively high. In this case, the delay duration should be reduced, to shorten a time spacing between the two clear channel assessments successively performed by the sending node, and increase the sending speed of a data frame. The dynamic adjustment coefficient $\beta$ is adjusted to a minimum value 1, and $T_{IFS}$ is the minimum value based on the formula 1 or formula 2. Therefore, a network latency is further shortened, data transmission efficiency and channel utilization are improved, and a network capacity is improved.

When the second value is greater than the second preset threshold, it indicates that a network is relatively congested, and the data transmission success rate is relatively low. In this case, the delay duration should be increased, to increase a time spacing between the two clear channel assessments successively performed by the sending node, and reduce the sending speed of a data frame. The dynamic adjustment coefficient $\beta$ is adjusted to a random value between the minimum value 1 and the maximum value $N_{max\_randnum}$ of the dynamic adjustment coefficient, and $T_{IFS}$ is increased based on the formula 1 or formula 2. Therefore, network congestion is prevented from continuing to deteriorate, the network packet loss rate and the data retransmission rate are further reduced, and a data transmission success rate is improved.

The following describes a manner in which the sending node sends a data frame to the receiving node when the delay duration is an IFS and the IFS is determined based on the foregoing formula 1 or formula 2.

In one embodiment, in S403, the sending, by a sending node, a data frame to a receiving node in the plurality of nodes may include:

selecting, by the sending node, a CSMA algorithm based on the dynamic adjustment coefficient β; and sending, by the sending node through the channel, the data frame to the receiving node based on the selected CSMA algorithm.

In one embodiment, selecting, by the sending node, a CSMA algorithm based on the dynamic adjustment coefficient β includes:

selecting a 1-persistence CSMA algorithm when the dynamic adjustment coefficient β is 1; and selecting a P-persistence CSMA algorithm when the dynamic adjustment coefficient β is greater than 1.

Specifically, the CSMA algorithm includes: a non-persistence CSMA algorithm, a 1-persistence CSMA algorithm, and a P-persistence CSMA algorithm. The P-persistence CSMA algorithm is a compromise between the non-persistence CSMA algorithm and the 1-persistence CSMA algorithm. The P-persistence CSMA algorithm can not only reduce conflicts like the non-persistence CSMA algorithm, but also reduce idle time of the channel like the 1-persistence CSMA algorithm. It should be noted that in the P-persistence CSMA algorithm, the sending node sends a data frame to the receiving node at a probability P. The probability P is greater than 0 and less than 1. A specific value of the probability P is not limited in this embodiment.

The sending node selects a CSMA algorithm based on the dynamic adjustment coefficient β. A smaller dynamic adjustment coefficient β indicates shorter duration of the IFS. Otherwise, a larger dynamic adjustment coefficient β indicates longer duration of the IFS. When the dynamic adjustment coefficient β is 1, the duration of the IFS is the shortest. In this case, the sending node may select the 1-persistence CSMA algorithm to send a data frame to the receiving node, to further reduce network conflicts, and improve data transmission efficiency. When the dynamic adjustment coefficient β is greater than 1, the sending node may select the P-persistence CSMA algorithm to send a data frame to the receiving node, to achieve a compromise effect between reducing network conflicts and reducing idle time of the channel.

In one embodiment, the data transmission method based on unslotted CSMA/CA provided in this embodiment may further include:

performing, by the sending node, a clear channel assessment on the channel after preset duration if determining, by using the P-persistence CSMA algorithm, that the data frame cannot be sent to the receiving node through the channel, and performing the data transmission method based on unslotted CSMA/CA provided in any implementation of this embodiment again.

Referring to Table 2, the preset duration may be denoted as $T_p$. It should be noted that a specific value of the preset duration is not limited in this embodiment.

Specifically, that the sending node selects the P-persistence CSMA algorithm to send a data frame is that the data frame is sent at the probability P. Then, the data frame is not sent at the probability 1-P. When determining not to send a data frame to the receiving node, the sending node may perform a first clear channel assessment on the channel after the preset duration, to perform the data transmission method based on unslotted CSMA/CA provided in any implementation of this embodiment.

In one embodiment, according to the data transmission method based on unslotted CSMA/CA provided in this embodiment, if the channel is determined busy through the first clear channel assessment, or the channel is determined busy through the second clear channel assessment, the data transmission method based on unslotted CSMA/CA may further include:

obtaining, by the sending node, a current number of backoffs NB and a backoff exponent BE.

If the number of backoffs NB is less than or equal to a preset maximum number of backoffs, the sending node updates the number of backoffs NB and the backoff exponent BE after backoff duration, performs the first clear channel assessment on the channel, and performs the data transmission method based on unslotted CSMA/CA provided in any implementation of this embodiment again. The backoff duration is a product of a random value between 0 and $2^{BE}-1a$ and a unit backoff period.

For details, refer to the embodiment shown in FIG. 2, and the technical principles and technical effects are similar. Details are not described herein again.

This embodiment provides a data transmission method based on unslotted CSMA/CA, and the method includes: determining, by the sending node in the plurality of nodes, that the channel is idle through the first clear channel assessment, waiting, by the sending node, for the delay duration, and performing the second clear channel assessment on the channel after the delay duration; and sending, by the sending node, the data frame to the receiving node in the plurality of nodes through the channel if determining that the channel is idle through the second clear channel assessment. According to the data transmission method based on unslotted CSMA/CA provided in this embodiment, the sending node performs a clear channel assessment twice before sending a data frame, so that a data frame with a low priority is prevented from preempting a channel resource of a data frame with a high priority, to reflect priorities of different types of data frames, a network latency is shortened, a network packet loss rate and a data retransmission rate are reduced, and data transmission efficiency and channel utilization are improved.

Figure 6:
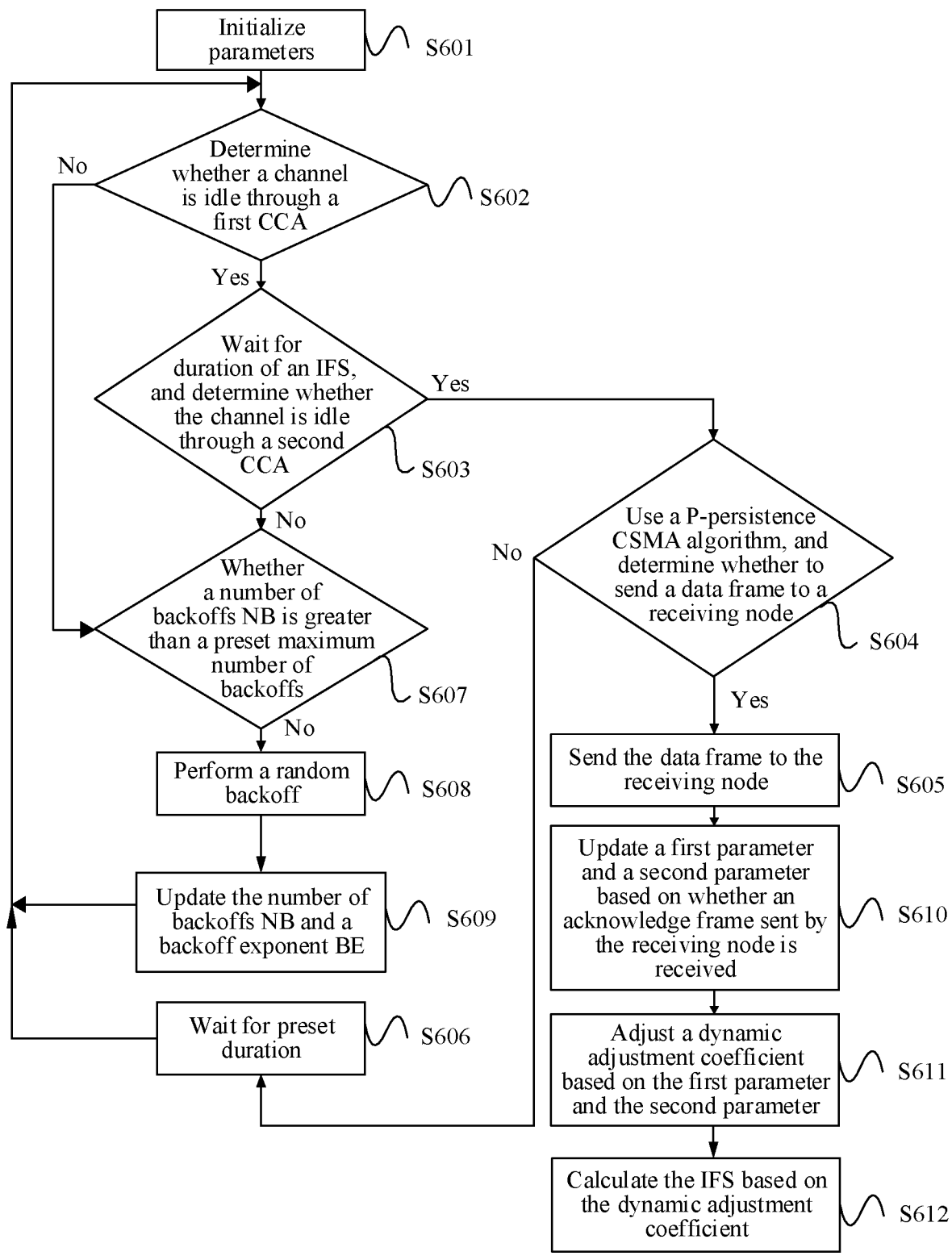
FIG. 6 is a flowchart of another data transmission method based on unslotted CSMA/CA according to an embodiment of this application.

FIG. 6 is a flowchart of another data transmission method based on unslotted CSMA/CA according to an embodiment of this application. Based on the embodiment shown in FIG. 4, this embodiment provides a specific implementation of the data transmission method based on unslotted CSMA/CA. In this embodiment, delay duration is an IFS. A sending node may adjust a length of the IFS based on a dynamic adjustment coefficient. The sending node sends a data frame by using a P-persistence CSMA algorithm. As shown in FIG. 6, the data transmission method may include the following operations.

S601: Initialize parameters.

Specifically, the sending node sets a number of backoffs NB to 0, and a backoff exponent BE is a minimum backoff exponent macMinBE.

S602: Determine whether a channel is idle through a first CCA.

If the channel is determined idle, S603 is performed. If the channel is determined busy, S607 is performed.

S603: Determine whether the channel is idle through the second CCA after duration of the IFS is waited for.

If the channel is determined idle, S604 is performed. If the channel is determined busy, S607 is performed.

S604: Use a P-persistence CSMA algorithm, and determine whether to send a data frame to a receiving node.

Specifically, the sending node sends the data frame by using the P-persistence CSMA algorithm, sends the data frame at a probability P, and stops sending the data frame at a probability 1-P. If it is determined to send the data frame to the receiving node, S605 is performed. If it is determined not to send the data frame to the receiving node, S606 is performed.

S605: Send the data frame to the receiving node through the channel.

Then, S610 to S612 are performed, to adjust the dynamic adjustment coefficient and adjust the length of the IFS based on the dynamic adjustment coefficient.

S606: Wait for preset duration.

Specifically, when determining not to send the data frame to the receiving node, the sending node may perform the first CCA on the channel again after the preset duration. Then, S602 is performed.

S607: Determine whether the number of backoffs NB is greater than the preset maximum number of backoffs.

Specifically, when determining that the channel is busy through the first CCA or the second CCA, the sending node may perform a random backoff based on the number of backoffs NB. When the number of backoffs NB is less than or equal to the preset maximum number of backoffs, S608 and S609 are performed to perform the random backoff. When the number of backoffs NB is greater than the preset maximum number of backoffs, it indicates that the sending node fails to access the channel, and the sending node gives up sending of the data frame of this time.

S608: Perform the random backoff.

Specifically, the sending node obtains a random value in a range $(0, 2^{BE}-1)$. A product of a unit backoff period aUnitBackoffPeriod and the random value is determined as backoff duration. The sending node performs a backoff based on the backoff duration.

S609: Update the number of backoffs NB and the backoff exponent BE after the random backoff ends.

Specifically, the sending node increases a value of the number of backoffs NB by 1. The sending node increases a value of the backoff exponent BE by 1. If an updated backoff exponent BE is greater than a maximum backoff exponent macMaxCsmaBackoffs, the value of the backoff exponent BE is updated as a maximum backoff exponent macMaxBE. Then, S602 is performed again.

S610: Update a first value and a second value based on whether an acknowledge frame sent by the receiving node is received.

S611: Adjust the dynamic adjustment coefficient β according to the first value and the second value based on the first value and the second value.

S612: Calculate the IFS based on the adjusted dynamic adjustment coefficient β.

Specifically, the adjusted IFS may be output to S603, so that the sending node performs the second CCA based on the adjusted IFS when sending a data frame next time.

For S601, S608, and S609, refer to the descriptions of S101, S102, and S105 in the embodiment shown in FIG. 2. For S602 and S603, refer to the related descriptions of S401 and S402 in the embodiment shown in FIG. 4. For other operations, refer to the related descriptions in the embodiment shown in FIG. 4. The technical principles and technical effects are similar, and details are not described herein again.

According to the data transmission method based on unslotted CSMA/CA provided in this embodiment, the sending node performs a CCA twice before sending a data frame. A data frame is sent by using the P-persistence CSMA algorithm only when the channel is determined idle by both of the two CCAs, and a time interval between the two CCAs may be dynamically adjusted. The data transmission method based on unslotted CSMA/CA provided in this embodiment shortens a network latency, reduces a network packet loss rate and a data retransmission rate, and improves data transmission efficiency and channel utilization.

Figure 7A:
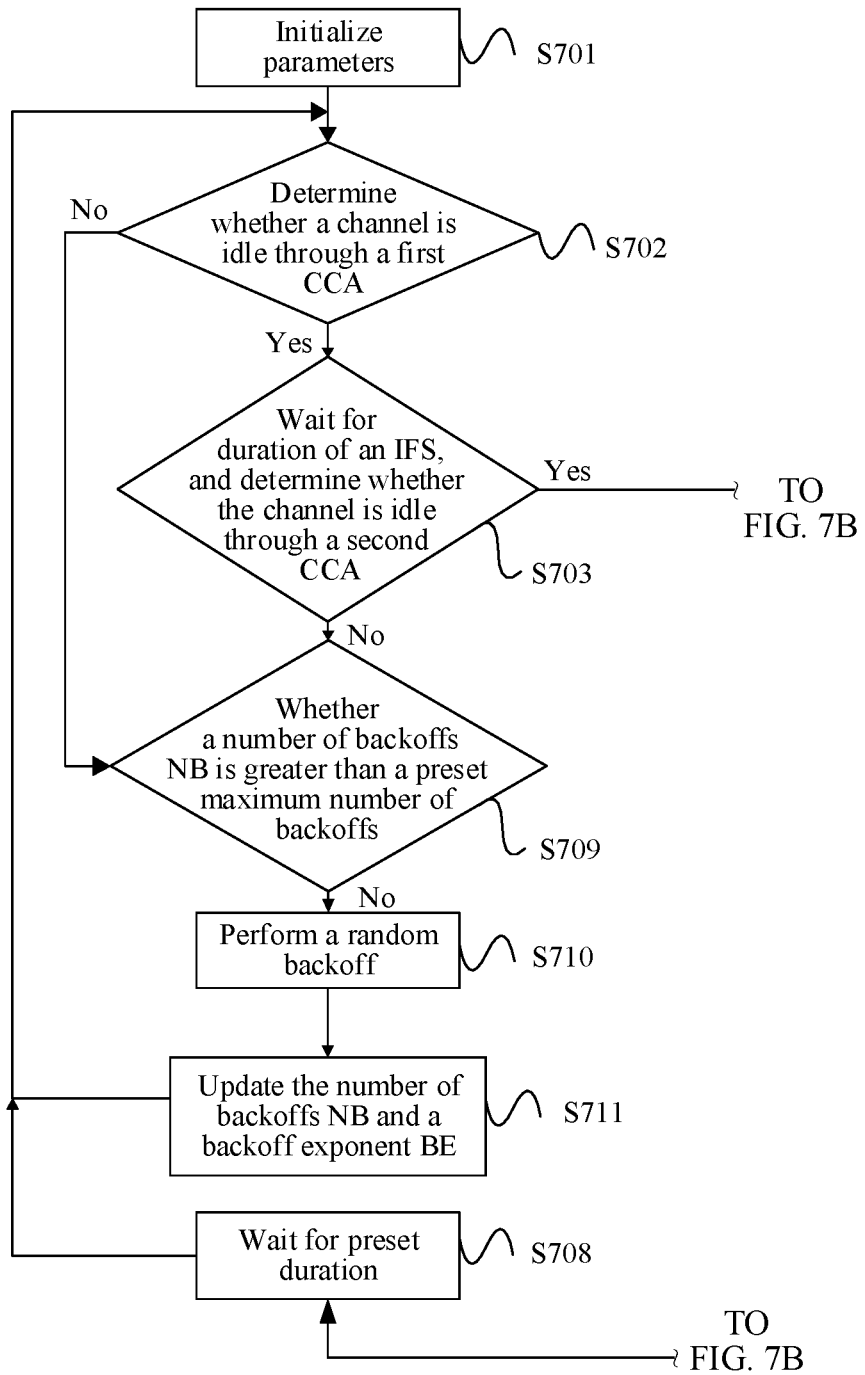
FIGS. 7A and 7B are flowcharts of still another data transmission method based on unslotted CSMA/CA according to an embodiment of this application.
Figure 7B:
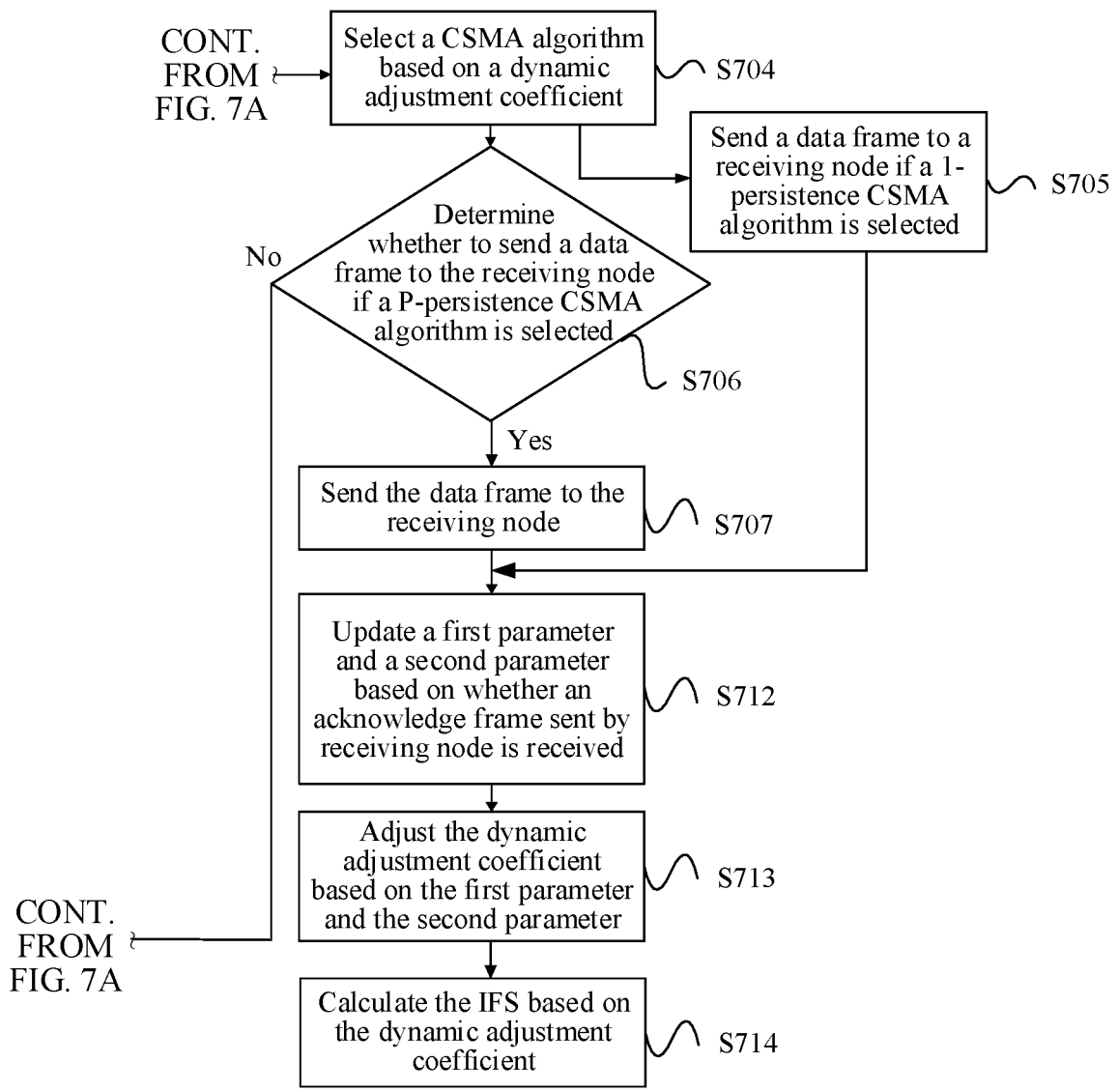

FIGS. 7A and 7B are flowcharts of still another data transmission method based on unslotted CSMA/CA according to an embodiment of this application. Based on the embodiment shown in FIG. 4, this embodiment provides another implementation of the data transmission method based on unslotted CSMA/CA. In this embodiment, a delay duration is an IFS. A sending node may adjust a length of the IFS based on a dynamic adjustment coefficient. The sending node may determine, based on the dynamic adjustment coefficient, a method for sending a data frame, that is, using a P-persistence CSMA algorithm or using a 1-persistence CSMA algorithm. As shown in FIGS. 7A and 7B, the data transmission method based on unslotted CSMA/CA provided in this embodiment may include:

S701: Initialize parameters.

Specifically, the sending node sets a number of backoffs NB to 0, and a backoff exponent BE is a minimum backoff exponent macMinBE.

S702: Determine whether a channel is idle through a first CCA.

If the channel is determined idle, S703 is performed. If the channel is determined busy, S709 is performed.

S703: Determine whether the channel is idle through a second CCA after duration of the IFS is waited for.

If the channel is determined idle, S704 is performed. If the channel is determined busy, S709 is performed.

S704: Select a CSMA algorithm based on the dynamic adjustment coefficient.

If the 1-persistence CSMA algorithm is selected, S705 is performed. If the P-persistence CSMA algorithm is selected, S706 is performed.

S705: The sending node sends a data frame to a receiving node through the channel when selecting the 1-persistence CSMA algorithm.

Then, S712 to S714 are performed, to adjust the dynamic adjustment coefficient and adjust the duration of the IFS based on the dynamic adjustment coefficient.

S706: Determine whether to send a data frame to the receiving node when the P-persistence CSMA algorithm is selected by the sending node.

Specifically, the sending node sends a data frame by using the P-persistence CSMA algorithm, the sending node sends a data frame at a probability P, and does not send a data frame at a probability 1-P. If it is determined to send a data frame to the receiving node, S707 is performed. If it is determined not to send a data frame to the receiving node, S708 is performed.

S707: Send the data frame to the receiving node through the channel.

Then, S712 to S714 are performed, to adjust the dynamic adjustment coefficient and adjust the duration of the IFS based on the dynamic adjustment coefficient.

S708: Wait for preset duration.

Specifically, when determining, by using the P-persistence CSMA algorithm, not to send a data frame to the receiving node, the sending node may perform the first CCA on the channel again after the preset duration. Then, S702 is performed.

S709: Determine whether the number of backoffs NB is greater than the preset maximum number of backoffs.

Specifically, when determining that the channel is busy through the first CCA or the second CCA, the sending node may perform a random backoff based on the number of backoffs NB. When the number of backoffs NB is less than or equal to the preset maximum number of backoffs, S710 and S711 are performed, to perform the random backoff. When the number of backoffs NB is greater than the preset maximum number of backoffs, it indicates that the node fails to access the channel, and the sending node gives up sending of the data frame of this time.

S710: Perform the random backoff.

Specifically, the sending node obtains a random value in a range $(0, 2^{BE}-1)$. A product of a unit backoff period aUnitBackoffPeriod and the random value is determined as backoff duration. The sending node performs the backoff based on the backoff duration.

S711: Update the number of backoffs NB and the backoff exponent BE after the random backoff ends.

Specifically, the sending node increases a value of the number of backoffs NB by 1. The sending node increases a value of the backoff exponent BE by 1. If an updated backoff exponent BE is greater than a maximum backoff exponent macMaxCsmaBackoffs, the value of the backoff exponent BE is updated as a maximum backoff exponent macMaxBE. Then, S702 is performed again.

S712: Update a first value and a second value based on whether an acknowledge frame sent by the receiving node is received.

S713: Adjust the dynamic adjustment coefficient β according to the first value and the second value based on the first value and the second value.

S714: Calculate the IFS based on the adjusted dynamic adjustment coefficient β.

Specifically, the adjusted IFS may be output to S703, so that the sending node performs the second CCA based on the adjusted IFS when sending a data frame next time.

For S701, S710, and S711, refer to the descriptions of S101, S102, and S105 in the embodiment shown in FIG. 2. For S702 and S703, refer to the related descriptions of S401 and S402 in the embodiment shown in FIG. 4. For other operations, refer to the related descriptions in the embodiment shown in FIG. 4. The technical principles and technical effects are similar, and details are not described herein again.

According to the data transmission method based on unslotted CSMA/CA provided in this embodiment, the sending node performs a CCA twice before sending a data frame. The data frame is sent based on the dynamic adjustment coefficient by using the P-persistence CSMA algorithm or the 1-persistence CSMA algorithm only when the channel is determined idle by both of the two CCAs. A time interval between the two CCAs may be dynamically adjusted based on the dynamic adjustment coefficient. The data transmission method based on unslotted CSMA/CA provided in this embodiment shortens a network latency, reduces a network packet loss rate and a data retransmission rate, and improves data transmission efficiency and channel utilization.

Figure 8:
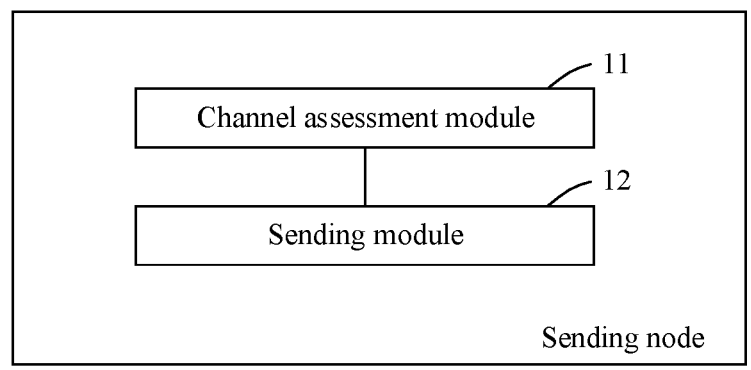
FIG. 8 is a schematic structural diagram of a sending node according to an embodiment of this application.

FIG. 8 is a schematic structural diagram of a sending node according to an embodiment of this application. The sending node provided in this embodiment is applied to a network based on an unslotted CSMA/CA mechanism. The network includes a plurality of nodes, and the plurality of nodes share one channel. The sending node may perform the data transmission method according to any implementation in FIG. 4 to FIGS. 7A and 7B, and may also be referred to as a data transmission apparatus. As shown in FIG. 8, the sending node provided in this embodiment may include:

a channel assessment module 11, configured to determine that the channel is idle through a first clear channel assessment, where the channel assessment module 11 is further configured to perform a second clear channel assessment on the channel after delay duration; and a sending module 12, configured to send a data frame to a receiving node in the plurality of nodes through the channel if determining, through the second clear channel assessment, that the channel is idle.

In one embodiment, a receiving module, an updating module, and an adjustment module are further included.

The updating module is configured to update a first value and a second value based on whether an acknowledge frame sent by the receiving node is received by the receiving module, where the first value is used to indicate a quantity of data frames successfully sent successively by the sending node, and the second value is used to indicate a quantity of data frames unsuccessfully sent successively by the sending node.

The adjustment module is configured to adjust the delay duration based on the first value and the second value.

In one embodiment, the delay duration is an interframe spacing IFS.

In one embodiment, if the data frame is a long frame, the IFS is $\max(T_{LIFS}, T_{turnaround}) + \beta \cdot T_{cca}$; or if the data frame is a short frame, the IFS is $\max(T_{SIFS}, T_{turnaround}) + \beta \cdot T_{cca}$; where $T_{LIFS}$ represents a preset long interframe spacing LIFS, $T_{SIFS}$ represents a preset short interframe spacing SIFS, $T_{turnaround}$ represents preset duration of switching between receiving and sending statuses of a transceiver, $T_{cca}$ represents duration required by a clear channel assessment, β represents a dynamic adjustment coefficient, and max( ) represents a MAX function.

In one embodiment, the adjustment module includes a coefficient adjustment unit and an IFS adjustment unit; where the coefficient adjustment unit is configured to adjust the dynamic adjustment coefficient β according to the first value and the second value based on the first value and the second value; and the IFS adjustment unit is configured to calculate the IFS based on an adjusted dynamic adjustment coefficient β.

In one embodiment, the coefficient adjustment unit is specifically configured to:

if the first value is greater than a first preset threshold, adjust the dynamic adjustment coefficient β is adjusted to 1; and if the second value is greater than a second preset threshold, adjust the dynamic adjustment coefficient β is adjusted to a random value between 1 and a maximum value of the dynamic adjustment coefficient, where the maximum value of the dynamic adjustment coefficient is greater than 1.

In one embodiment, the sending module 12 includes an algorithm selection unit and a sending unit, where the algorithm selection unit is configured to select a CSMA algorithm based on the dynamic adjustment coefficient β; and the sending unit is configured to send the data frame to the receiving node through the channel based on the selected CSMA algorithm, where the algorithm selection unit is specifically configured to:
select a 1-persistence CSMA algorithm when the dynamic adjustment coefficient β is 1; and
select a P-persistence CSMA algorithm when the dynamic adjustment coefficient β is greater than 1.

In one embodiment, the channel assessment module 11 is further configured to:
perform, by the sending unit, the first clear channel assessment on the channel again after the preset duration if determining, by using the P-persistence CSMA algorithm, that the data frame cannot be sent to the receiving node through the channel.

In one embodiment, the updating module is specifically configured to:
increase the first value by 1 and set the second value to 0 if the receiving module receives the acknowledge frame sent by the receiving node; or
increase the second value by 1 and set the first value to 0 if the receiving module does not receive the acknowledge frame sent by the receiving node.

In one embodiment, the sending node further includes a backoff module. The backoff module is configured to:
obtain a current number of backoffs NB and a backoff exponent BE if the channel is determined busy through the first clear channel assessment or if the channel is determined busy through the second clear channel assessment by the channel assessment module 11; and
update the number of backoffs NB and the backoff exponent after backoff duration if the number of backoffs NB is less than or equal to a preset maximum number of backoffs, where the backoff duration is a product of a random value between 0 and $2^{BE}-1$ an and a unit backoff period.

The channel assessment module 11 is further configured to perform the first clear channel assessment on the channel again after the backoff duration.

The technical principles and technical effects of the sending node provided in this embodiment are similar to those of the data transmission method provided in any implementation of FIG. 4 to FIGS. 7A and 7B. Details are not described herein again.

Figure 9:
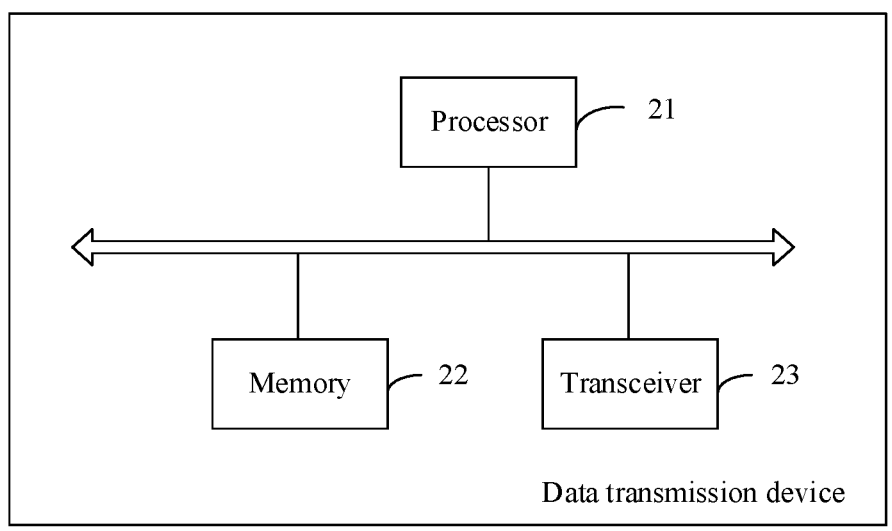
FIG. 9 is a schematic structural diagram of a data transmission device according to an embodiment of this application.

FIG. 9 is a schematic structural diagram of a data transmission device according to an embodiment of this application. The data transmission device provided in this embodiment is applied to a network based on an unslotted CSMA/CA mechanism. The network includes a plurality of nodes, and the plurality of nodes share one channel. The data transmission device may perform the data transmission method provided in any implementation of FIG. 4 to FIGS. 7A and 7B, that is, the data transmission device may be a sending node. As shown in FIG. 9, the data transmission device provided in this embodiment may include: a processor 21, a memory 22, and a transceiver 23. The transceiver 23 is configured to receive data or send data, the memory 22 is configured to store instructions, and the processor 21 is configured to execute the instructions stored in the memory 22 to implement the data transmission method according to any implementation of FIG. 4 to FIGS. 7A and 7B. The technical principles and technical effects of the data transmission device provided in this embodiment are similar to those of the data transmission method provided in any implementation of FIG. 4 to FIGS. 7A and 7B. Details are not described herein again.

It should be understood that the module division of the foregoing apparatus is merely logical function division. During actual implementation, all or some of the modules may be integrated into one physical entity or may be physically separate. The modules may all be implemented in a form in which a processing element invokes software; or may all be implemented in a form of hardware; or some modules may be implemented in a form in which a processing element invokes software, and some modules are implemented in a form of hardware. For example, the channel assessment module may be an independently disposed processing element, or may be integrated into a chip of the foregoing apparatus. In addition, the channel assessment module may be stored in a memory of the foregoing apparatus in a form of program code, and the program code is invoked by a processing element of the foregoing apparatus to perform a function of the foregoing channel assessment module. Implementation of other modules is similar. In addition, all or some of the modules may be integrated together, or may be independently implemented. The processing element herein may be an integrated circuit and has a signal processing capability. In an implementation process, operations in the foregoing methods or the foregoing modules can be implemented by using a hardware integrated logical circuit in the processing element, or by using instructions in a form of software.

For example, the foregoing modules may be one or more integrated circuits configured to implement the foregoing method, such as one or more application-specific integrated circuits (ASIC), one or more digital signal processors (DSP), or one or more field-programmable gate arrays (FPGA). For another example, when one of the foregoing modules is implemented in a form in which a processing element invokes program code, the processing element may be a general-purpose processor, for example, a central processing unit (CPU) or another processor that can invoke the program code. For another example, the modules may be integrated together, and are implemented in a form of a system-on-a-chip (SOC).

In the embodiments of this application, the processor may be a general processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in the embodiments of this application. The universal processor may be a microprocessor or any conventional processor or the like. The operations of the method disclosed with reference to the embodiments of this application may be directly performed by a hardware processor, or may be performed by using a combination of hardware in the processor and a software module.

In the embodiments of this application, the memory may be a non-volatile memory, for example, a hard disk drive (HDD) or a solid-state drive (SSD), or may be a volatile memory, for example, a random access memory (RAM). The memory is any other medium that can carry or store expected program code in a form of an instruction or a data structure and can be accessed by a computer, but is not limited thereto. The memory in the embodiments of this application may alternatively be a circuit or any other apparatus that can implement a storage function, and is configured to store a program instruction and/or data.

It may be understood that numerical symbols involved in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A data transmission method, applied to a network based on an unslotted carrier sense multiple access with collision avoidance (CSMA/CA) mechanism, wherein the network comprises a plurality of nodes, the plurality of nodes share a channel, and the method comprises:
   determining, by a sending node in the plurality of nodes through a first clear channel assessment, that the channel is idle;
   waiting, by the sending node, for a delay duration, and performing a second clear channel assessment on the channel after the delay duration, wherein the delay duration is an interframe spacing (IFS); and
   sending, by the sending node, a data frame to a receiving node in the plurality of nodes through the channel in response to determining, through the second clear channel assessment, that the channel is idle, wherein when the data frame is a long frame, the IFS is $\max(T_{LIFS}, T_{turnaround}) + \beta \cdot T_{cca}$, or when the data frame is a short frame, the IFS is $\max(T_{SIFS}, T_{turnaround}) + \beta \cdot T_{cca}$, wherein $T_{LIFS}$ represents a preset long interframe spacing LIFS, $T_{SIFS}$ represents a preset short interframe spacing (SIFS), $T_{turnaround}$ represents a preset duration of switching between receiving and sending statuses of a transceiver, $T_{cca}$ represents a duration required by a clear channel assessment, $\beta$ represents a dynamic adjustment coefficient, and max( ) represents a MAX function.

2. The method according to claim 1, further comprising:
   updating, by the sending node, a first value and a second value based on whether an acknowledge frame sent by the receiving node is received by the sending node, wherein the first value indicates a quantity of data frames successfully sent successively by the sending node, and the second value indicates a quantity of data frames unsuccessfully sent successively by the sending node; and
   adjusting, by the sending node, the delay duration based on the first value and the second value.

3. The method according to claim 2, wherein the adjusting, by the sending node, the delay duration based on the first value and the second value comprises:
   adjusting, by the sending node, the dynamic adjustment coefficient $\beta$ based on the first value and the second value; and
   calculating, by the sending node, the IFS based on an adjusted dynamic adjustment coefficient $\beta$.

4. The method according to claim 3, wherein the adjusting, by the sending node, the dynamic adjustment coefficient $\beta$ based on the first value and the second value comprises:
   when the first value is greater than a first preset threshold, adjusting the dynamic adjustment coefficient $\beta$ is adjusted to 1; and
   when the second value is greater than a second preset threshold, adjusting the dynamic adjustment coefficient $\beta$ is adjusted to a random value between 1 and a maximum value of the dynamic adjustment coefficient, wherein the maximum value of the dynamic adjustment coefficient is greater than 1.

5. The method according to claim 2, wherein the updating, by the sending node, the first value and the second value based on whether the acknowledge frame sent by the receiving node is received by the sending node comprises:
   increasing, by the sending node, the first value by 1 and setting the second value to 0 if receiving the acknowledge frame sent by the receiving node; or
   increasing, by the sending node, the second value by 1 and setting the first value to 0 if the sending node does not receive the acknowledge frame sent by the receiving node.

6. The method according to claim 1, wherein the sending, by the sending node, the data frame to the receiving node in the plurality of nodes through the channel comprises:
   selecting, by the sending node, a CSMA algorithm based on the dynamic adjustment coefficient $\beta$; and
   sending, by the sending node through the channel, the data frame to the receiving node based on the selected CSMA algorithm, wherein
   the selecting, by the sending node, a CSMA algorithm based on the dynamic adjustment coefficient $\beta$ comprises:
   selecting a 1-persistence CSMA algorithm when the dynamic adjustment coefficient $\beta$ is 1; and
   selecting a P-persistence CSMA algorithm when the dynamic adjustment coefficient $\beta$ is greater than 1.

7. The method according to claim 6, further comprising:
   performing, by the sending node, a clear channel assessment on the channel after a preset duration if determining, by using the P-persistence CSMA algorithm, that the data frame cannot be sent to the receiving node through the channel, and performing the data transmission method again.

8. A data transmission apparatus, applied to a network based on an unslotted carrier sense multiple access with collision avoidance (CSMA/CA) mechanism, wherein the network comprises a plurality of nodes, the plurality of nodes share a channel, the data transmission apparatus is a sending node in the plurality of nodes, and the apparatus comprises a memory and a processor, wherein:
   the memory is configured to store instructions, and the processor is configured to execute the instruction stored in the memory to implement a data transmission method comprising:
   determining, through a first clear channel assessment, that the channel is idle;
   waiting for a delay duration, and performing a second clear channel assessment on the channel after the delay duration, wherein the delay duration is an interframe spacing (IFS; and
   sending a data frame to a receiving node in the plurality of nodes through the channel in response to determining, through the second clear channel assessment, that the channel is idle, wherein $T_{LIFS}$ represents a preset long interframe spacing LIFS, $T_{SIFS}$ represents a preset short interframe spacing (SIFS), $T_{turnaround}$ represents a preset duration of switching between receiving and sending statuses of a transceiver, $T_{cca}$ represents a duration required by a clear channel assessment, $\beta$ represents a dynamic adjustment coefficient, and max( ) represents a MAX function.

9. The data transmission apparatus according to claim 8, the method further comprises:
   updating a first value and a second value based on whether an acknowledge frame sent by the receiving node is received, wherein the first value indicates a quantity of data frames successfully sent successively, and the second value indicates a quantity of data frames unsuccessfully sent successively; and
   adjusting, by the sending node, the delay duration based on the first value and the second value.

10. The data transmission apparatus according to claim 9, wherein the adjusting the delay duration based on the first value and the second value comprises:
- adjusting the dynamic adjustment coefficient $\beta$ based on the first value and the second value; and
- calculating the IFS based on an adjusted dynamic adjustment coefficient $\beta$.

11. The data transmission apparatus according to claim 10, wherein the adjusting the dynamic adjustment coefficient $\beta$ based on the first value and the second value comprises:
- when the first value is greater than a first preset threshold, adjusting the dynamic adjustment coefficient $\beta$ is adjusted to 1; and
- when the second value is greater than a second preset threshold, adjusting the dynamic adjustment coefficient $\beta$ is adjusted to a random value between 1 and a maximum value of the dynamic adjustment coefficient, wherein the maximum value of the dynamic adjustment coefficient is greater than 1.

12. The data transmission apparatus according to claim 9, wherein the sending the data frame to the receiving node in the plurality of nodes through the channel comprises:
- selecting a CSMA algorithm based on the dynamic adjustment coefficient $\beta$; and
- sending, by the sending node through the channel, the data frame to the receiving node based on the selected CSMA algorithm, wherein the selecting a CSMA algorithm based on the dynamic adjustment coefficient $\beta$ comprises:
- selecting a 1-persistence CSMA algorithm when the dynamic adjustment coefficient $\beta$ is 1; and
- selecting a P-persistence CSMA algorithm when the dynamic adjustment coefficient $\beta$ is greater than 1.

13. The data transmission apparatus according to claim 12, further comprising:
- performing a clear channel assessment on the channel after a preset duration if determining, by using the P-persistence CSMA algorithm, that the data frame cannot be sent to the receiving node through the channel, and performing the data transmission method again.

14. The data transmission apparatus according to claim 9, wherein the updating of the first value and the second value based on whether the acknowledge frame sent by the receiving node is received by the sending node comprises:
- increasing the first value by 1 and setting the second value to 0 if receiving the acknowledge frame sent by the receiving node; or
- increasing the second value by 1 and setting the first value to 0 if the sending node does not receive the acknowledge frame sent by the receiving node.

* * * * *